US010186788B2

(12) United States Patent
Heeter et al.

(10) Patent No.: US 10,186,788 B2
(45) Date of Patent: Jan. 22, 2019

(54) SLEEVED FASTENER ASSEMBLY

(71) Applicant: The Boeing Company, Chicago, IL (US)

(72) Inventors: Russell J. Heeter, Sammamish, WA (US); Thu A. Nguyen, Mukilteo, WA (US); John A. Ward, Bonney Lake, WA (US); John R. Porter, Lynwood, WA (US); Jeffrey A. Wilkerson, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/156,071

(22) Filed: May 16, 2016

(65) Prior Publication Data

US 2016/0261052 A1    Sep. 8, 2016

Related U.S. Application Data

(62) Division of application No. 13/758,612, filed on Feb. 4, 2013, now Pat. No. 9,343,824.

(51) Int. Cl.
| | |
|---|---|
| *H01R 4/30* | (2006.01) |
| *H01R 43/16* | (2006.01) |
| *B64D 45/02* | (2006.01) |
| *F16B 33/00* | (2006.01) |
| *F16B 1/00* | (2006.01) |

(52) U.S. Cl.
CPC ............ *H01R 4/304* (2013.01); *B64D 45/02* (2013.01); *F16B 33/006* (2013.01); *H01R 43/16* (2013.01); *F16B 2001/0064* (2013.01)

(58) Field of Classification Search
CPC ................................ H01R 4/304; H01R 43/16
See application file for complete search history.

(56) References Cited

U.S. PATENT DOCUMENTS

| | | |
|---|---|---|
| 3,130,991 A | 4/1964 | Renato |
| 3,355,205 A | 11/1967 | Wagner et al. |
| 3,461,769 A | 8/1969 | Brosseit |
| 3,485,132 A | 12/1969 | Hanny et al. |
| 3,498,352 A | 3/1970 | Duffy |
| 3,639,137 A | 2/1972 | Marinelli |

(Continued)

FOREIGN PATENT DOCUMENTS

| | | |
|---|---|---|
| CN | 101153623 A | 4/2008 |
| CN | 101925517 A | 12/2010 |

(Continued)

OTHER PUBLICATIONS

Machine translation of DE 2306891 B1, Hoeckele, Max, translated on May 15, 2017, pp. 1-7.*

(Continued)

*Primary Examiner* — Teresa M Ekiert
(74) *Attorney, Agent, or Firm* — Parsons Behle & Latimer (57) ABSTRACT

A conductive fastener assembly, system, and method are described. The fastener assembly includes a nut having a counterbore formed therein. The counterbore is formed to maintain a sufficient gap between the nut and the protruding end of a fastener sleeve. The nut with the counterbore improves the conductive fastener system such that the need for a solid copper grid and a cap seal is reduced or eliminated.

17 Claims, 5 Drawing Sheets

(56) References Cited

U.S. PATENT DOCUMENTS

| | | | |
|---|---|---|---|
| 3,653,675 | A | 4/1972 | Schaefer |
| 3,667,340 | A | 6/1972 | Black et al. |
| 3,746,068 | A | 7/1973 | Deckert et al. |
| 3,820,297 | A | 6/1974 | Hurd |
| 3,835,612 | A | 9/1974 | Beziat |
| 3,835,615 | A | 9/1974 | King |
| 4,023,882 | A * | 5/1977 | Pettersson ............... H01R 4/26 439/426 |
| 4,102,036 | A | 7/1978 | Salter |
| 4,260,005 | A | 4/1981 | Stencel |
| 4,405,256 | A * | 9/1983 | King, Jr. ............... B21J 15/043 411/69 |
| 4,556,439 | A | 12/1985 | Bannink, Jr. |
| 4,755,904 | A | 7/1988 | Brick |
| 4,850,771 | A | 7/1989 | Hurd |
| 5,123,792 | A | 6/1992 | Strobel |
| 5,141,373 | A | 8/1992 | Kendall |
| 5,391,028 | A | 2/1995 | Charles |
| 5,577,854 | A | 11/1996 | Jacob et al. |
| 5,730,540 | A * | 3/1998 | Duran ............... F16B 5/0208 411/112 |
| 5,860,778 | A | 1/1999 | Keener |
| 5,895,186 | A | 4/1999 | Giannuzzi et al. |
| 6,149,363 | A | 11/2000 | March |
| 6,305,991 | B1 * | 10/2001 | Gerster ............... H01R 4/26 439/801 |
| 6,357,953 | B1 | 3/2002 | Ballantyne |
| 6,776,566 | B2 | 8/2004 | Kobusch et al. |
| 7,195,437 | B2 | 3/2007 | Sakamoto |
| 7,695,226 | B2 | 4/2010 | March et al. |
| 7,898,785 | B2 | 3/2011 | Winter et al. |
| 7,950,885 | B2 | 5/2011 | Rosenkranz |
| 8,312,606 | B2 | 11/2012 | Reid et al. |
| 2004/0005207 | A1 | 1/2004 | Wallace |
| 2008/0075555 | A1 | 3/2008 | March et al. |
| 2009/0178262 | A1 | 7/2009 | Reid et al. |
| 2010/0124472 | A1 | 5/2010 | Nguyen et al. |
| 2011/0142567 | A1 | 6/2011 | Haylock et al. |
| 2013/0124472 | A1 | 5/2013 | Srivastava et al. |

FOREIGN PATENT DOCUMENTS

| | | | |
|---|---|---|---|
| CN | 102042288 A | 5/2011 | |
| CN | 102555329 A | 7/2012 | |
| DE | 2306891 B1 * | 10/1973 | ............... H01R 4/26 |
| EP | 1903221 | 3/2008 | |
| EP | 1903221 A2 | 3/2008 | |
| JP | 2001510422 | 7/2001 | |
| JP | 2011102123 | 5/2011 | |
| JP | 2013224142 | 10/2013 | |
| JP | 2013249917 | 12/2013 | |
| WO | WO8705976 | 10/1987 | |
| WO | WO8705976 A1 | 10/1987 | |
| WO | 1999051494 | 10/1999 | |
| WO | WO2011050040 | 4/2011 | |

OTHER PUBLICATIONS

The State Intellectual Property Office of the People's Republic of China; First Office Action issued in Chinese Patent Application No. 2013800722656; dated Jun. 27, 2016.

ARP5577 "Aircraft Lightning Direct Effects Certification" http://standards.sae.org/arp5577, Sep. 30, 2002.

ARP5412 "Aircraft Lightning Environment and Related Test Waveforms" http://standards.sae.org/arp5412/, Nov. 1, 1999.

US Patent and Trademark Office; Office Action for U.S. Appl. No. 13/728,804 dated Dec. 19, 2013.

International Searching Authority; International Search Report and Written Opinion issued in PCT/US2013/077387 and dated Mar. 21, 2014.

International Searching Authority; International Search Report and Written Opinion issued in Serial No. PCT/2013/077087 dated Feb. 28, 2014.

US Patent and Trademark office; Office Action issued in U.S. Appl. No. 12/272,553; dated Jul. 6, 2011.

US Patent and Trademark Office; Office Action issued in U.S. Appl. No. 12/272,553; dated Sep. 14, 2011.

US Patent and Trademark Office; Office Action issued in U.S. Appl. No. 12/272,553; dated Feb. 15, 2012.

US Patent and Trademark Office; Office Action issued in U.S. Appl. No. 12/272,553; dated Jun. 19, 2012.

US Patent and Trademark Office; Office Action issued in U.S. Appl. No. 13/728,804; dated Aug. 1, 2014.

US Patent and Trademark Office; Office Action issued in U.S. Appl. No. 13/728,804; dated Nov. 5, 2014.

US Patent and Trademark Office; Office Action issued in U.S. Appl. No. 13/758,612; dated Nov. 6, 2014.

US Patent and Trademark Office; Office Action issued in U.S. Appl. No. 13/758,612; dated Jan. 16, 2015.

US Patent and Trademark Office; Office Action issued in U.S. Appl. No. 13/758,539; dated Mar. 12, 2015.

US Patent and Trademark Office; Office Action issued in U.S. Appl. No. 13/758,612; dated Apr. 13, 2015.

US Patent and Trademark Office; Office Action issued in U.S. Appl. No. 13/758,612; dated Jun. 23, 2015.

The International Bureau of WIPO; International Preliminary Report on Patentability for Application No. PCT/ US2013/077387; dated Aug. 13, 2015.

The International Bureau of WIPO; International Preliminary Report on Patentability for Application No. PCT/ US2013/077087; dated Aug. 13, 2015.

US Patent and Trademark Office; Office Action issued in U.S. Appl. No. 13/758,539; dated Sep. 1, 2015.

Japan Patent Office; Office Action; Japan Patent Application No. 2015-556011; dated Nov. 20, 2017.

* cited by examiner

SLEEVED FASTENER ASSEMBLY

CROSS-REFERENCE TO RELATED APPLICATIONS

This application is a divisional of and claims the benefit of U.S. patent application Ser. No. 13/758,612 filed on Feb. 4, 2013, and entitled "Sleeved Fastener Assembly," issued as U.S. Pat. No. 9,343,824, the contents of which are hereby incorporated by reference herein.

FIELD

The disclosure relates to fasteners for fastening structures to each other. More particularly, the disclosure relates to a conductive sleeved fastener assembly which provides an electrically-conductive interface between a fastener sleeve and a fastener while inhibiting undesired electrical contact with other elements.

BACKGROUND

In some aerospace applications, it may be desirable to secure structures to each other using a fastener. A fastener having a diameter which is greater than the diameter of a fastener opening provided in the structures to be secured may be forced into the fastener opening to achieve an interference fit of the fastener in the fastener opening. A lubricant such as cadmium, for example and without limitation, may be coated on the fastener shank to provide the necessary lubricity to insert the fastener in the fastener opening. In the case of composite structures and titanium structures, however, it may be desirable to use a sleeved fastener.

In order to reliably install a sleeved fastener into sleeve openings provided in the structures, it may be necessary to lubricate the shank of the fastener. In some applications, multiple lubricants may be applied to the fastener shank to lubricate the fastener shank in the sleeve. The lubricant(s) may be applied to the fastener shank and/or to the interior surface of the sleeve. The lubricants may electrically insulate the fastener from the fastener sleeve. In some applications, it may be desirable to enhance the electrical conductivity between the fastener and the fastener sleeve.

Even where a desired level of conductivity between the fastener and the fastener sleeve is achieved, however, additional issues may arise when the fastener and sleeve are assembled and result in incidental contact with other elements of the structure or assembly. Therefore, a conductive sleeved fastener assembly which provides an electrically-conductive interface between a fastener sleeve and the fastener while preventing incidental contact with other structural elements may be desirable for some applications.

SUMMARY

The disclosure is generally directed to a conductive sleeved fastener assembly and system and a method for preparing such. An illustrative embodiment of the sleeved fastener assembly includes a fastener, a fastener sleeve, and a nut attached to a fastener shank of the fastener. The nut is prepared having a counterbore that maintains a desired gap between the nut and the fastener sleeve, in both radial and axial directions.

One aspect of the present disclosure provides a conductive sleeved fastener assembly comprising an electrically-conductive fastener having a fastener head and a fastener shank extending from said fastener head. The fastener shank may further comprise an attachment portion located at a distal end of the fastener shank. The fastener assembly further comprises an electrically-conductive fastener sleeve having a fastener sleeve flare, and a nut configured to attach to the fastener shank. The nut may comprise a counterbore having a counterbore diameter and a counterbore depth that are sized to achieve a radial gap and an axial gap, respectively, between the nut and an end of the fastener sleeve. The counterbore may be formed having with a fillet therein. The fastener head and the fastener sleeve flare may be formed having a countersink configuration. The fastener assembly may further comprise a lubricant, such as a solid film lubricant or dielectric layer, wherein the lubricant is omitted from an interface between the fastener head and the fastener sleeve flare.

Another aspect of the present disclosure provides a conductive sleeved fastening system for attaching a first structure to a second structure, wherein the first structure and the second structure include a first hole and a second hole, respectively. The system further comprises an electrically-conductive fastener, having a fastener head and a fastener shank extending from the fastener head, and an electrically-conductive fastener sleeve configured to be placed through said first hole and said second hole when said first hole and second hole are aligned. The fastener sleeve is also configured to receive the fastener shank. The fastener sleeve may further comprise a protruding end that extends beyond the second structure when the fastener sleeve is arranged through said first hole and said second hole. The system further comprises a nut having a counterbore formed therein. The counterbore is formed having a counterbore diameter and a counterbore depth that are sized to achieve a radial gap and an axial gap, respectively, between the nut and a protruding end of the fastener sleeve. The system may further comprise an expanded metal foil disposed on the first structure and/or a fay seal arranged between the first structure and the second structure. The fay seal may be omitted from an area surrounding the fastener assembly.

Yet another aspect of the present disclosure provides a method of preparing a conductive sleeved fastening system for use. The method comprises providing a fastener configured to be disposed in a fastener sleeve, determining an appropriate radial gap and axial gap, and preparing a nut with a counterbore that maintains the appropriate radial gap and axial gap. The method may further comprise arranging an expanded metal foil on a first structure and/or arranging a fay seal between the first structure and the second structure, wherein the fay seal is omitted from an area surrounding fastener assembly.

Other systems, methods, features, and advantages of the present disclosure will be or become apparent to one with skill in the art upon examination of the following drawings and detailed description. The features, functions and advantages that have been discussed can be achieved independently in various configurations of the present disclosure or may be combined in yet other configurations further details of which can be seen with reference to the following description and drawings.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

In the following description, reference is made to the accompanying drawings, which form a part hereof, and in which is shown, by way of illustration, various configurations of the present disclosure. It is understood that other embodiments may be utilized and changes may be made without departing from the scope of the present disclosure.

Figure 1A:
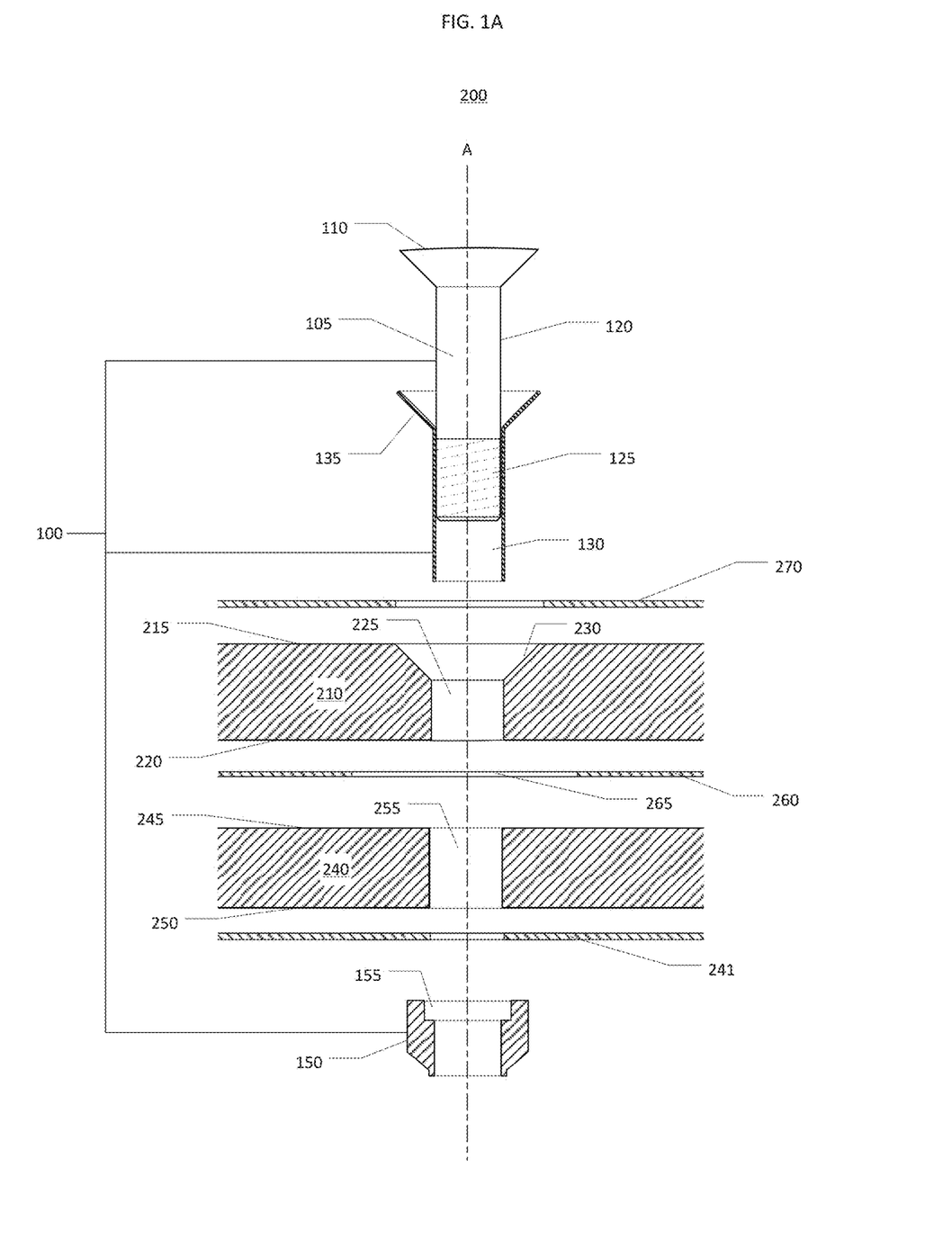
FIG. 1A is an exploded and partially sectioned view of a conductive fastening system, according to one example of the disclosure.
Figure 1B:
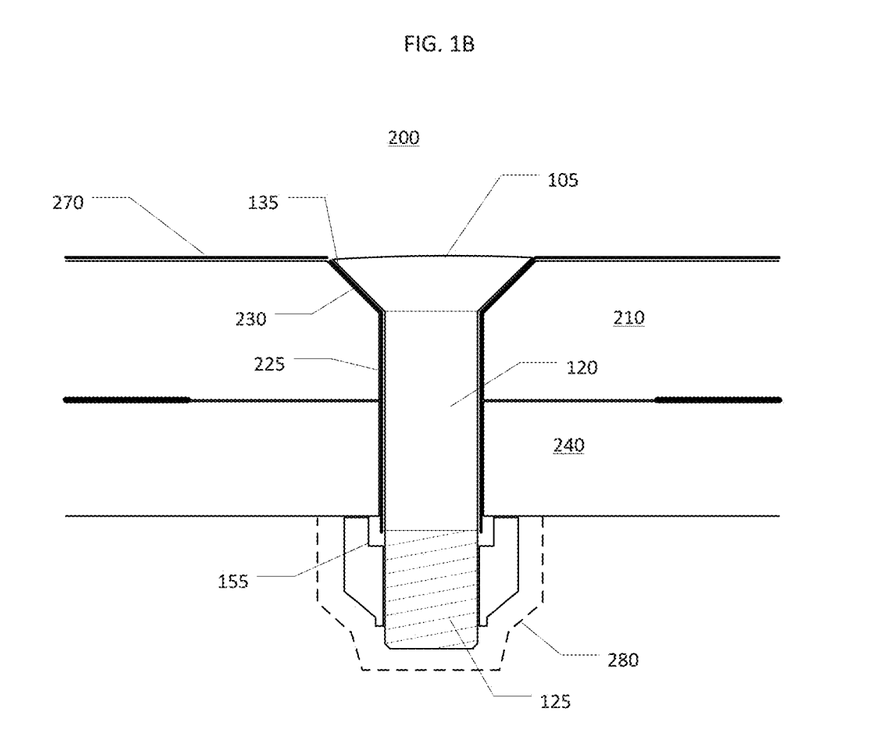
FIG. 1B is an partially sectioned view of a conductive fastening system, according to another example of the disclosure.
Figure 1C:
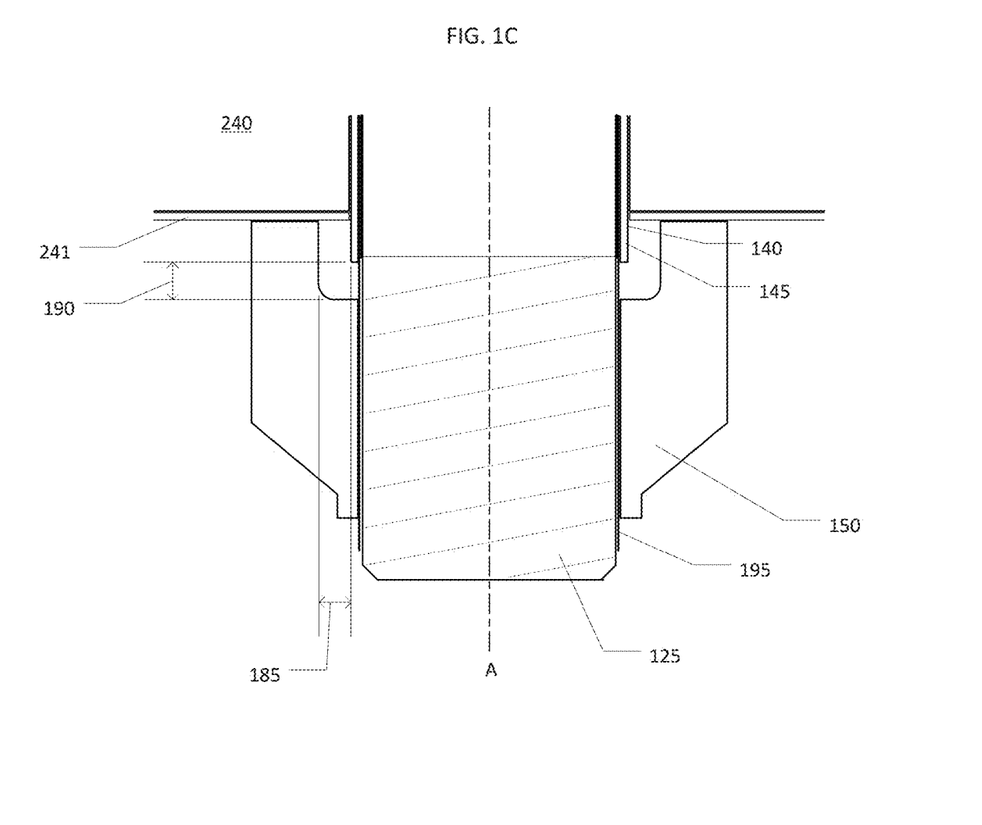
FIG. 1C is a detailed view of the conductive fastening system depicted in FIG. 1B.

FIGS. 1A-1C are illustrations depicting an example of a conductive fastening system according to the present disclosure, comprising a conductive fastener assembly 100 as part of a conductive fastener system 200. The conductive fastener assembly 100 includes a fastener 105, a fastener sleeve 130, and a nut 150. The fastener 105 comprises a fastener head 110, a fastener shank 120, and may also include an attachment portion 125 of the fastener shank 120. The attachment portion 125 is configured to receive a nut or collar to engage and secure to the shank. The attachment portion may be for example a threaded surface or an annular grooved surface. The fastener sleeve includes a flare 135 at one end. The nut 150 is located at a distal end of the fastener shank 120 and comprises a counterbore 155. The counterbore 155 maintains a radial gap 185 between the nut 150 and an outer surface 140 of the fastener sleeve 130, and an axial gap 190 between a protruding end 145 of the fastener sleeve 130 and the nut 150. A lubricant 195 may be disposed between the fastener 105 and the fastener sleeve 130 and between the fastener 105 and the nut 150.

In addition to the conductive fastener assembly 100, the conductive fastening system 200 comprises a first structure 210 and a second structure 240. The first structure 210 further comprises a top surface 215, a first facing surface 220, and a first hole 225. A standard countersink 230 may be formed at the intersection of the top surface 215 and the first hole 225. The second structure 240 comprises a second facing surface 245, a bottom surface 250, and a second hole 255. The conductive fastening system 200 may further comprise a fay seal 260, a conductive surface 270, and a bottom layer 241. Further, the first or section structure may be a low electrically conductive structure such as a glass or carbon composite for example. More specifically, the first or second structure may be a material having a higher electrical resistance than the fastener.

An electrically-conductive fastener 105 may include a fastener head 110 and a fastener shank 120 which extends from the fastener head 110. The surface of the fastener head 110 may be a bare metal surface without a coating or solid film lubricant. The fastener shank 120 of the fastener 105 may extend through the fastener sleeve 130 and the fastener head 110 may engage the fastener sleeve 130. The fastener head 110 may be in direct engagement with a fastener sleeve flare 135 when the fastener 105 fully engages the fastener sleeve 130. As shown in FIGS. 1B and 1C, the fastener shank 120 may extend beyond the second structure 240 and may receive a nut 150 which may be tightened against the second structure 240 or a bottom layer 241 disposed thereon.

The fastener head 110 and the fastener sleeve flare 135 may be formed having a countersink configuration, wherein the fastener sleeve flare 135 and the facing surface of the fastener head 110 are placed at an angle that is less than 90° relative to the central axis A. Alternatively, the fastener sleeve flare 135 may comprise a flange, wherein the fastener sleeve flare 135 is approximately 90° relative to the central axis A.

Referring again to FIG. 1C, the nut 150 of the conductive fastener assembly 100 is formed having a counterbore 155 located on the side of the nut 150 facing the bottom surface 250 of the second structure 255. While the illustrated example depicts a fastener shank 120 with an attachment portion 125 for mating with the nut 150, the nut 150 and the fastener shank 120 may be configured to employ any appropriate design methods known in the art, including those that may be developed. For example, the fastener and nut assembly may comprise a lockbolt and collar type system where the fastener comprises annual grooves and the nut comprises a collar is un-threaded where the inner wall of the caller is designed to flow into the annual grooves of the fastener.

The counterbore 155 is formed along the central axis "A" with a counterbore diameter and a counterbore depth that are chosen to maintain an acceptable radial gap 185 and axial gap 190. The radial gap 185 is defined as the distance between the outer surface 140 of the fastener sleeve 130 and the inward-facing surface 160 of the counterbore 155, (see FIG. 2), and is substantially constant along any radial direction extending from central axis A. The axial gap 190 is defined as the distance, in a direction parallel to the axis, between the distal end of the protruding end 145 of the fastener sleeve and a bottom surface 165 of the counterbore, (see FIG. 2). For example, under a given set of conditions, (which may include, for example, the materials and the intended use of the system), one may determine a minimum radial gap and a minimum axial gap. In some instances, it may be sufficient to design the counterbore 155 such that the radial gap and axial gap are always greater than 0. In one example used for fastening aircraft structures, a minimum radial gap may be set at 0.015 inches with a minimum axial gap of 0.050 inches.

Figure 2:
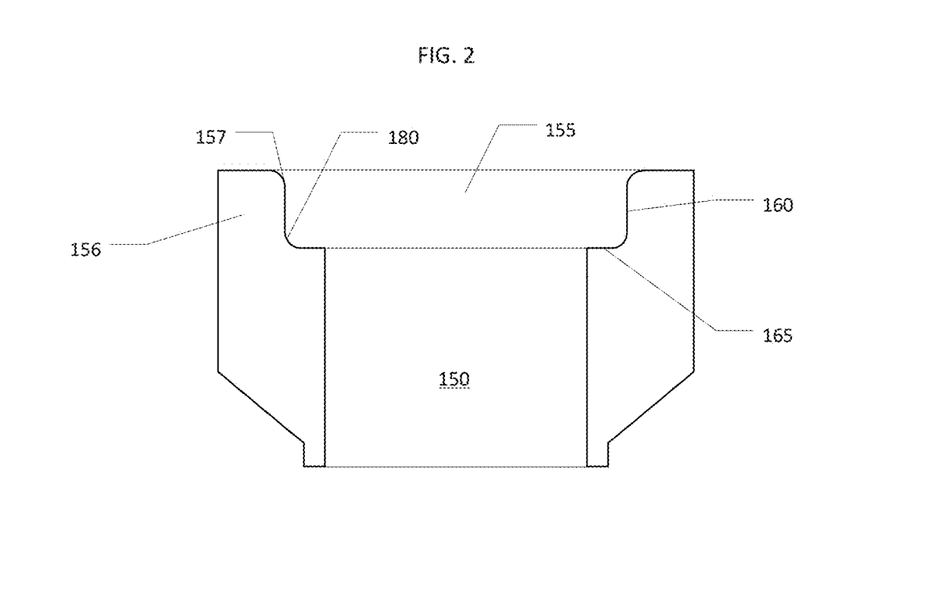
FIG. 2 is a detailed view of a nut depicted, in accordance with another example of the disclosure.

Referring to FIG. 2, the formation of the counterbore 155 in nut 150 may include other features that improve the performance of the fastening system 200. For example, a fillet 180 may be formed at the intersection of the inward-facing surface 160 and the bottom surface 165 of the counterbore 155. A fillet or rounded section may reduce the potential for arcing between the electrically conductive fastener sleeve 130 and the nut 150. In the aircraft example discussed above, a fillet with a radius of 0.010 inches may be used. Other portions of the nut may also be rounded. For example, FIG. 2 shows a rounded shoulder 157 formed at a mouth of the counterbore 155.

The formation of the counterbore 155 forms a rim 156 of nut 150, wherein a top of the rim 156 is in contact with the second structure 240, or the bottom layer 241 as the case may be. The design of the nut 150 and the size of the counterbore 155 should result in a rim 156 that will resist deformation as the fastener assembly 100 is tightened.

The conductive fastener assembly 100 may be used in wide range of situations, and the illustration depicts a generic fastener assembly system 200. The first structure 210 and second structure 240, may vary in thickness and material. The fastener assembly system 200 may further comprise a plurality of structures, wherein the first structure 210 represents the outermost structure, i.e., where the fastener head 110 is arranged, and wherein the second structure 240 represents the innermost structure, i.e., where the nut 150 is located. The first structure 210 and the second structure 240 may be the same material or differing materials, such as a metal and a fiber-reinforced composite material.

A first hole 225 is drilled or otherwise formed in the first structure 210 and a corresponding second hole 255 is formed in the second structure 240. The location of the holes 225, 255 are chosen to result in the desired arrangement of the structures 210, 240 when the fastener assembly 100 is employed. The diameter of the holes 225, 255 is chosen in accordance with the diameter of the fastener sleeve 130, and may be configured to create an interference fit.

Referring again to FIGS. 1A and 1B, the top of the first hole 225 may be formed with a standard countersink 230 that corresponds with the countersink configuration of the fastener assembly 100. As used in the present disclosure, the term "standard countersink" is not intended to indicate a specific angle or diameter, but instead is used to differentiate the countersink illustrated from a "deep countersink" wherein the fastener head 110 would rest substantially below the top surface 215 of the first structure 210. Some examples of the fastener assembly system 200 may employ a deep countersink for a particular application, but other features of the design of the fastener assembly system 200 of the present disclosure is intended to reduce the need for a deep countersink for many applications. While the figures show a fastener comprising a head and fastener sleeve having a countersink configuration, in operation the fastener head may be of any type such as a protruding head.

The fastener assembly system 200 may be assembled with additional features where necessary. For example, FIGS. 1A and 1B depict a conductive surface 270 that may be arranged, for example, on the top surface 215 of the first structure 210. The conductive surface 270 may be arranged on the top surface 215 using an automated process. The advantages of the present disclosure allow thinner and more easily-applied substances, such as, for example, an expanded metal foil or other thin metallic surfaces such as expanded copper foil, to be used as the conductive surface 270.

FIGS. 1A and 1B also depict a fay seal 260 disposed between the first facing surface 220 and the second facing surface 245. A fay seal is typically used for fluid exclusion and corrosion resistance and provides containment capability associated with potential sparking in this interface. The fastener assembly system 200 of the present disclosure may employ a fay seal 260, and, in some instances, omit the fay seal 260 from an area 265 surrounding the fastener assembly 100. Alternatively, the fay seal 260 may be removed from the assembly where protection from electrical phenomena is not required.

In operation, a particular fastener 105 and fastener sleeve 130 may be chosen according to the overall thickness of the first structure 210 and the second structure 240, as well as any intervening elements, such as a fay seal 260 and/or a bottom layer 240. The fastener sleeve 130 should have a protruding end 145 that extends beyond the second structure 250 and, where applicable, the bottom layer 241. The different sizes of fasteners 105 and fastener sleeves 130 available may determine the largest amount of variance that must be considered when determining the counterbore depth.

Another advantage of the fastener assembly system 200 of the present disclosure is that a cap seal 280 may not be a necessary features for some assembly situations where arcing is undesirable. For this purpose, the cap seal 280, denoted by the dashed outline in FIG. 1B, is shown as missing from the illustrated example.

Figure 3:
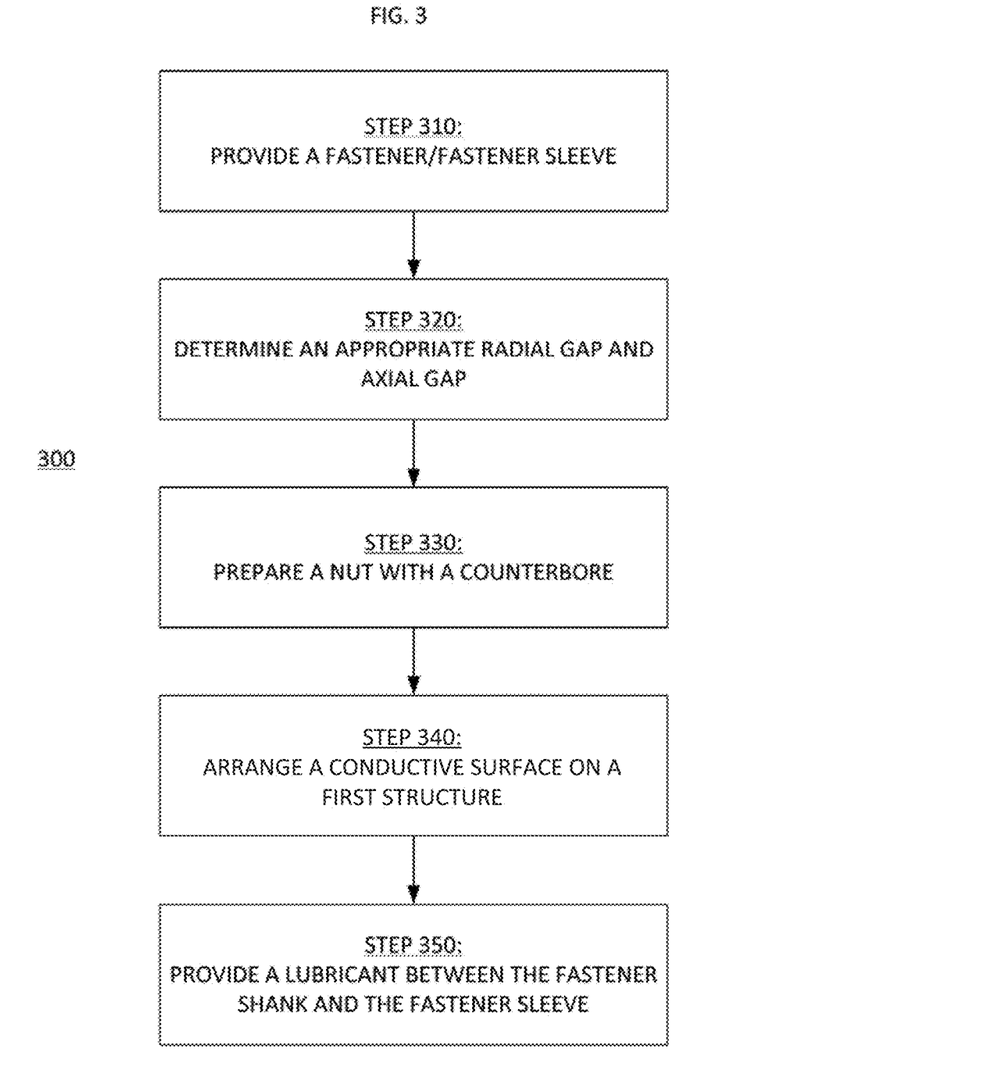
FIG. 3 is a flowchart depicting a method for preparing a fastening system, in accordance with another example of the disclosure.

FIG. 3 illustrates a method 300 of preparing a conductive sleeved fastening system for use in accordance with the present disclosure, which method 300 may comprise any or all of the following steps. Step 310 of the method 300 comprises providing a fastener having a fastener head, a fastener shank extending from said fastener head, and a fastener sleeve provided on said fastener shank and a fastener sleeve flare on said fastener sleeve. Step 320 comprises determining an appropriate radial gap 185 and an appropriate axial gap 190 for the desired use of the fastener system 200. Step 330 comprises preparing a nut 150 configured to attach to the fastener shank 120 by forming a counterbore 155 therein. The counterbore 155 may be formed according to the result of step 320 and may include a fillet 180 at an intersection between an inward-facing surface 160 and a bottom surface 165. Step 340 comprises arranging a conductive surface 270 on a top surface 215 of a first structure 210. Finally, step 350 comprises placing a lubricant 195 between the fastener shank 120 and the fastener sleeve 130. Step 350 may further include omitting the lubricant 195 from an interface between the fastener head 110 and the fastener sleeve flare 135.

Figure 4:
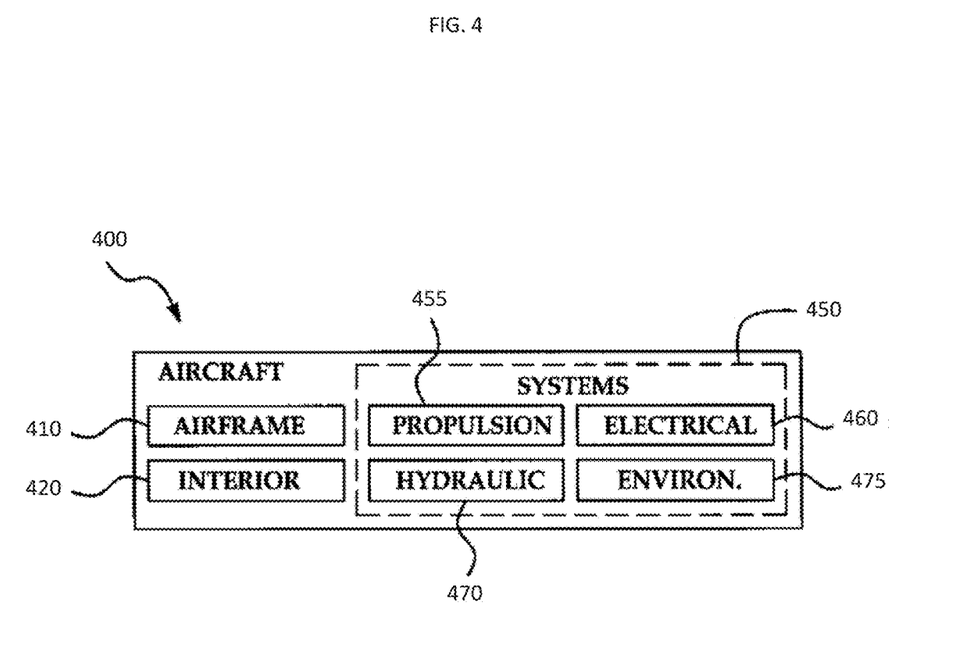
FIG. 4 is a block diagram of an aircraft, in accordance with another example of the disclosure.

As shown in FIG. 4, the aircraft 400 produced using the method 300, system 200, and/or assembly 100 described herein, may include an airframe 410 with a plurality of systems 450 and an interior 420. Examples of high-level systems 450 include one or more of a propulsion system 455 an electrical system 460, a hydraulic system 470, and an environmental system 475. Any number of other systems may be included. Although an aerospace example is shown, the principles of this disclosure may be applied to other industries, including, but not limited to, the construction and automotive industries.

The examples provided herein may be used in the context of aircraft manufacturing and service. During pre-production, an exemplary method may include specification and design of the aircraft and material procurement. During production, component and subassembly manufacturing and system integration of the aircraft takes place. Thereafter, the aircraft may go through certification and delivery in order to be placed in service. While in service by a customer, the aircraft may be scheduled for routine maintenance and service (which may also include modification, reconfiguration, refurbishment, and so on).

The various steps of the method 300 described herein may be employed during any one or more of the stages of production and service. For example, components or subassemblies corresponding to production process may be fabricated or manufactured in a manner similar to components or subassemblies produced while the aircraft is in service. Also, one or more apparatus embodiments may be utilized during the production stages, for example, by substantially expediting assembly of or reducing the cost of an aircraft. Similarly, one or more apparatus embodiments may be utilized while the aircraft is in service, for example and without limitation, to maintenance and service.

It should be emphasized that the above-described configurations of the present device and process are merely possible examples of implementations and merely set forth for a clear understanding of the principles of the disclosure. Many different configurations of the disclosure described herein may be designed and/or fabricated without departing from the spirit and scope of the disclosure. All these and other such modifications and variations are intended to be included herein within the scope of this disclosure and protected by the following claims. Therefore the scope of the disclosure is not intended to be limited except as indicated in the appended claims.

What is claimed is:

1. A method of preparing a conductive sleeved fastening system for use, comprising:
   providing a fastener having a fastener head, a fastener shank extending from said fastener head, and a fastener sleeve provided on said fastener shank and a fastener sleeve flare on said fastener sleeve;
   preparing a nut configured to attach to the fastener shank, by forming a counterbore therein, the counterbore extending from a top surface of the nut and having:
      a counterbore diameter sized to maintain a radial gap between an inward-facing surface of the counterbore and an outer surface of the fastener sleeve; and
      a counterbore depth sized to maintain an axial gap between a distal end of the fastener sleeve and a bottom surface of the counterbore; and
   forming a fillet between the inward-facing surface and the bottom surface of the counterbore.

2. The method of claim 1, further comprising forming the fastener head and the fastener sleeve flare with a countersink configuration.

3. The method of claim 1, further comprising: providing a first structure and a second structure, wherein the fastener sleeve is configured to extend through the first structure and the second structure with a protruding end of the fastener sleeve extending beyond the second structure.

4. The method of claim 3, further comprising arranging a fay seal between the first structure and the second structure, wherein the fay seal is omitted from an area surrounding the fastener.

5. The method of claim 3, further comprising arranging an expanded metal foil on a top surface of said first structure.

6. The method of claim 1, further comprising placing a lubricant between the fastener shank and the fastener sleeve, wherein the lubricant is omitted from an interface between the fastener head and the fastener sleeve flare.

7. The method of claim 1, further comprising determining a minimum radial gap and a minimum axial gap based on the materials and intended use of the conductive sleeved fastening system.

8. The method of claim 1, wherein a thickness of the radial gap is greater than a thickness of a wall of the fastener sleeve.

9. The method of claim 1, wherein the radial gap is at least 0.015 inches.

10. A method comprising:
    providing a fastener having a fastener head, a fastener shank extending from said fastener head, and a fastener sleeve provided on said fastener shank and a fastener sleeve flare on said fastener sleeve;
    preparing a nut configured to attach to the fastener shank, by forming a counterbore therein, the counterbore extending from a top surface of the nut and having:
       a counterbore diameter sized to maintain a radial gap between an inward-facing surface of the counterbore and an outer surface of the fastener sleeve; and
       a counterbore depth sized to maintain an axial gap between a distal end of the fastener sleeve and a bottom surface of the counterbore;
    forming a fillet between the inward-facing surface and the bottom surface of the counterbore; and
    arranging a fay seal on a surface of at least one of two structures to be fastened together, the two structures having aligned holes therein, wherein the fay seal is omitted from an area surrounding the holes.

11. The method of claim 10, further comprising arranging an expanded metal foil on a top surface of at least one of the two structures.

12. The method of claim 10, further comprising placing a lubricant between the fastener shank and the fastener sleeve, wherein the lubricant is omitted from an interface between the fastener head and the fastener sleeve flare.

13. A method comprising:
    forming a fastener having a fastener head and a fastener shank extending from the fastener head;
    arranging a fastener sleeve on the fastener shank;
    forming a counterbore within a nut, the counterbore extending from a top surface of the nut, wherein a radius of the counterbore is sized to maintain a radial gap between an inward-facing surface of the counterbore and an outer surface of the fastener sleeve, and wherein a depth of the counterbore is sized to maintain an axial gap between a distal end of the fastener sleeve and a bottom surface of the counterbore;
    forming a fillet between the inward-facing surface and the bottom surface of the counterbore; and
    arranging a fay seal on a surface of at least one of two structures to be fastened together, wherein the two structures have aligned holes defined therein, and wherein the fay seal is omitted from an area surrounding the holes.

14. The method of claim 13, further comprising forming a fastener sleeve flare on the fastener sleeve.

15. The method of claim 13, further comprising arranging an expanded metal foil on a surface of at least one of the two structures.

16. The method of claim 13, further comprising placing a lubricant between the fastener shank and the fastener sleeve, wherein the lubricant is omitted from an interface between the fastener head and a fastener sleeve flare of the fastener sleeve.

17. The method of claim 13, wherein at least one of the two structures has an electrical resistance higher than an electrical resistance of the fastener.

* * * * *